May 2, 1933.    J. W. M. PROSSER    1,907,365
GAS TANK CAP LOCK
Filed March 1, 1932    2 Sheets-Sheet 1
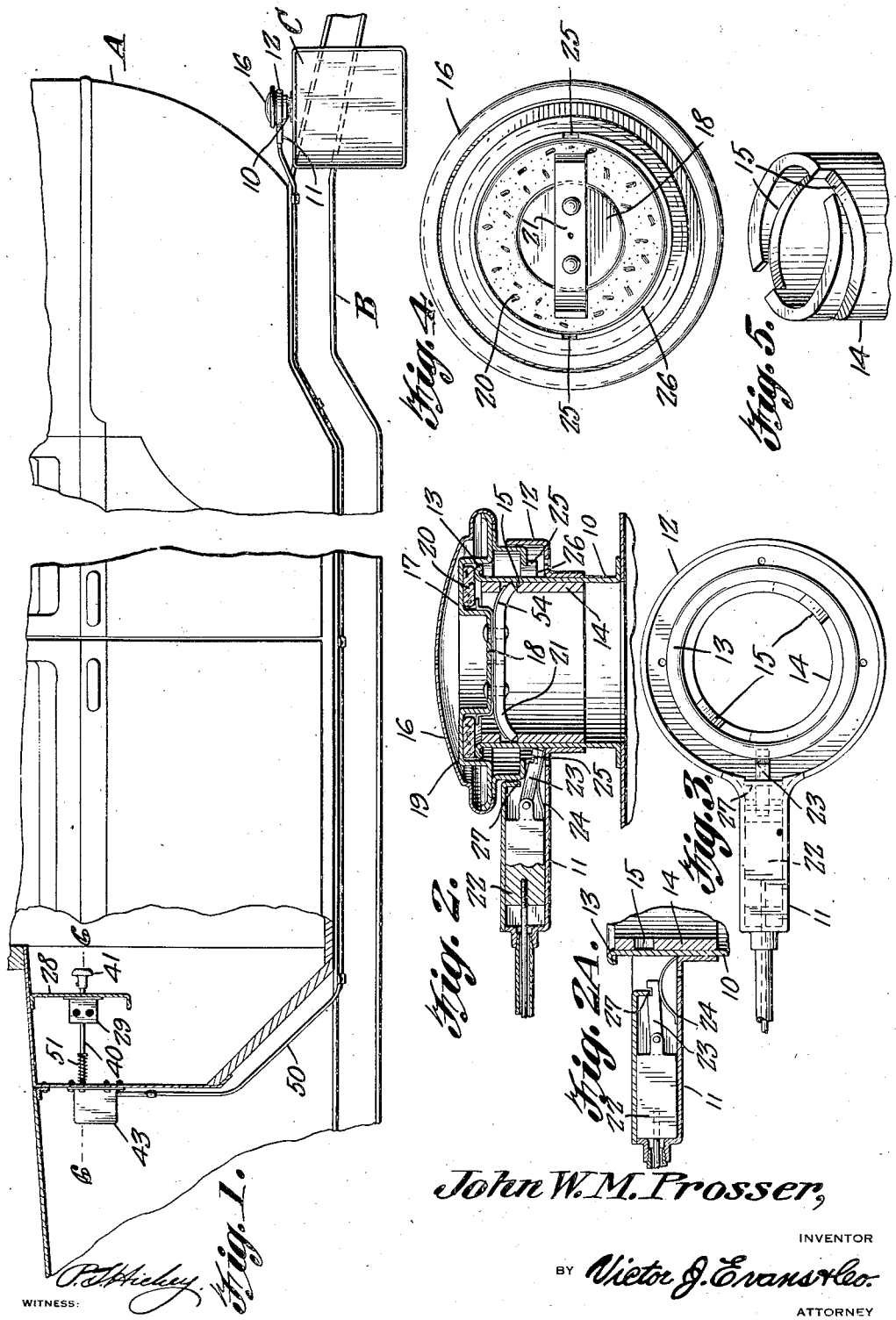
John W. M. Prosser,
INVENTOR
BY Victor J. Evans & Co.
ATTORNEY

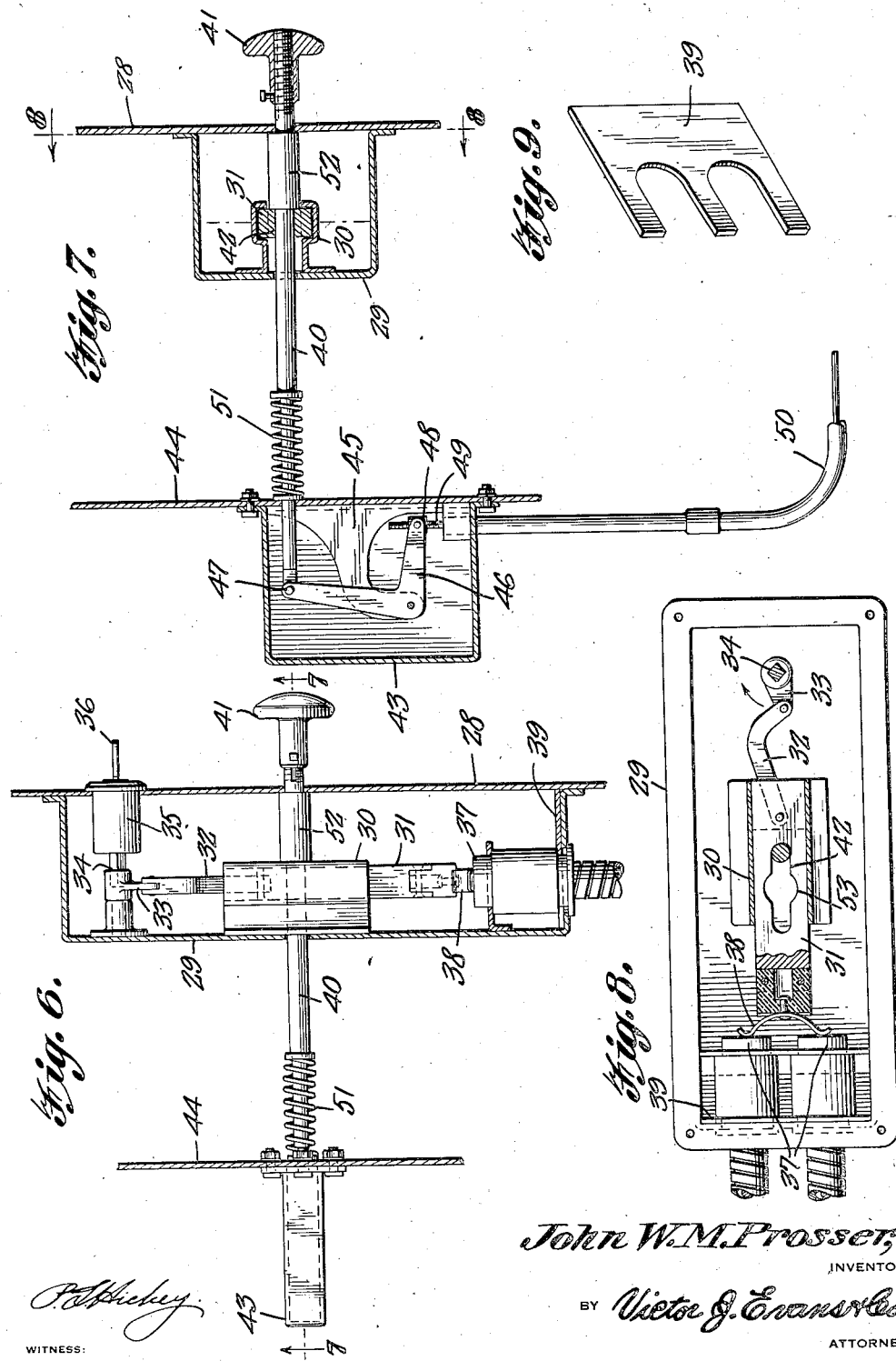

Patented May 2, 1933

1,907,365

UNITED STATES PATENT OFFICE

JOHN W. M. PROSSER, OF KLONDYKE, OHIO

GAS TANK CAP LOCK

Application filed March 1, 1932. Serial No. 596,074.

The invention relates to a gas tank lock and more particularly to a locking mechanism for gas tank caps for use in automobiles or the like.

The primary object of the invention is the provision of mechanism of this character, wherein the same constitutes a part of the equipment of an automobile or the like and is in association with the electric ignition switch so that when the cap to the gasoline tank is locked the switch of the ignition system will be closed and upon the release of such cap the said ignition switch will be open, thus assuring protection against conflagration on the filling of the gasoline tank of the automobile or the like.

Another object of the invention is the provision of the mechanism of this character, wherein the cap of the gasoline tank of the automobile or the like can be securely fastened and the release of such cap is under the control of the operator of the automobile or the like, the cap and the locking mechanism therefor being of novel form and the control of such mechanism being related with the switch of the electric ignition system of the automobile or the like, so that upon operation of the control the switch will be simultaneously operated therewith and such switch being closed when the cap is locked and open when the cap is released.

A further object of the invention is the provision of mechanism of this character, wherein the parts thereof are housed and mounted in a novel manner within the automobile or the like.

A still further object of the invention is the provision of mechanism of this character which is extremely simple in construction, readily and easily operated, thoroughly reliable and efficient in its purpose, strong, durable, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 1 is a fragmentary elevation partly in section of an automobile of standard construction showing the gas tank cap lock mechanism constructed in accordance with the invention applied thereto.

Figure 2 is an enlarged fragmentary vertical sectional view through the gas tank and cap showing the said cap in locked position.

Figure 2a is a similar view showing the cap released and removed from the tank.

Figure 3 is a top plan view of the filling nipple of the gas tank and detail adjuncts.

Figure 4 is a bottom plan view of the cap.

Figure 5 is a fragmentary perspective view of the filling nipple of the gas tank with the cap removed.

Figure 6 is a fragmentary enlarged sectional view on the line 6—6 of Figure 1.

Figure 7 is a sectional view on the line 7—7 of Figure 6.

Figure 8 is a sectional view on the line 8—8 of Figure 7.

Figure 9 is a perspective view of a retaining plate for the switch of the ignition system of the automobile.

Similar reference characters indicate corresponding parts throughout the several views in the drawings.

Referring to the drawings in detail, A designates generally a portion of the body of an automobile, B a portion of its chassis and C the gas tank supported within the latter, these being of conventional form. Formed on the tank C is a filling spout or nipple 10 having externally thereof a latch housing 11 with a circular portion 12 embracing the spout or nipple 10 and opening upwardly. The free open end of the nipple or spout 10 is formed with an outwardly curled edge 13 while within said spout or nipple is a sleeve-like lining 14, the latter extending close to the free end of the spout or nipple and is provided with diametrically disposed bayonet slots 15, the entrance thereto being through the outer free edge of said lining 14. Adapted to be removably fitted upon the spout or nipple 10 is a closure cap 16, the inner part 17 thereof being formed with a bulged center 18 to provide concentrically of the latter a suitable seat 19 for a gasket 20 which is adapted to rest upon the curled edge 13 of the spout or nipple 10 when the cap 16 is applied. The bulged center 18 has fixed thereto a retaining strip 21 adapted to have its free end engage in the slots 15 and upon rotation of the cap 16 upon the nipple or spout 10 to clamp the said cap 16 tight thereon, compressing the gasket 20 against the edge 13 of said spout or nipple.

Fitted within the housing 11 is a slide block 22 having pivoted thereto a dog 23 which is operated upon by a leaf spring 24 to urge the dog in an upward direction. On movement of the slide block 22 toward the spout or nipple 10 the same will be projected into either of the notches 25 formed diametrically opposite each other in an annular skirt 26 carried by and depending from the inner part 17 of the cap 16 and in this fashion the said cap will be locked upon the spout or nipple. The housing 22 at its upper side has bent therefrom a depending keeper 27 with which is adapted to be engaged the dog 23 under the action of the spring 24 when the sliding block 22 is moved away from the nipple or spout 10 and thus locking the slide block 22 against movement. The skirt 26 of the cap 16 upon the application of the latter on the spout or nipple 10 when the dog 23 is engaged with the keeper 27 will depress the said dog 23 and thus releasing it from the keeper 27 so that the block 22 may be moved in the housing 11 to position for the locking of said cap.

Upon the instrument board 28 in the body A of the automobile is mounted a casing 29 having interiorly thereof a guide 30 in which is fitted a slide 31, the latter having pivoted thereto a link 32 which is also pivoted to a crank arm 33 upon the turning member 34 of a key operated locking mechanism indicated generally at 35 and its key at 36. Located at one end of the casing 29 is the switch 37 of the electric ignition system as employed in the automobile A and the opening and closing member 38 of this switch is carried by the slide 31 so that on movement of the slide in one direction the said switch 37 is closed and upon movement in the opposite direction such switch is open and in this fashion the ignition system is controlled. The switch 37 is retained in the casing 29 through the medium of the retaining plate 39, the mounting of which being shown in Figures 6 and 8 of the drawings.

Intersecting the slide 31 is an actuater rod 40 which extends through the instrument board 28 in convenient reach of the operator of the automobile and this extended end carries a hand knob 41, the slide being formed with an elongated slot 42 providing a clearance for the rod 40 to permit shifting of said slide 31. The rod 40 extends into a housing 43 suitably mounted upon the dash or partition 44 within the body A of the automobile and within this housing is a hanger 45 pivotally supporting a bell crank lever 46, one end pivoted at 47 to the rod 40 and the other end adjustably coupled at 48 to a flexible rod 49, the latter being connected to the slide block 22 and is confined within a conduit 50 which leads from the housing 11 to the housing 43 and is a protective conduit for the said rod 49 as will be apparent.

The rod 40 is tensioned by a spring 51 which is active to move said rod 40 in a direction to throw the block 22 in the housing 11 toward the spout or nipple 10 for urging the dog 23 into locking relation to the cap 16 except when the block 22 is held immovable by the dog 23 engaging the keeper 27 and this engagement can only take place when the cap 16 has been removed from the nipple or spout 10.

The rod 40 has formed thereon a circular abutment 52 which normally contacts with the slide 31, the slot 42 therein being provided medially with a cutaway portion 53 constituting a clearance for the abutment 52 when this cutaway portion 53 registers with said abutment, so that when the slide 31 has been moved by the lock mechanism 35 to have the cutaway portion 53 register with the abutment 52 on the rod 40, the latter can be pushed open at the knob 41 to rock the lever 46 which pulls the flexible rod 49 and this shifts the block 22 in the housing 11 in a direction to have the dog 23 become released from the cap 16 and this dog under the action of the spring 24 be automatically brought into latching engagement with the keeper 27 on the housing 11, whereupon the said cap 16 can be removed from the nipple or spout 10 for the opening of the tank C to permit filling thereof with gasoline. When the lock mechanism 35 has been operated to shift the slide 31 to permit the rod 40 to be pushed open at the knob 41 for releasing the cap 16 the switch 37 of the ignition system will have been opened and thus cutting off ignition to the engine of the automobile. This pushing upon the rod 50 pulls the flexible rod 49 to shift the block 22 in the housing 11, retracting the dog 23 and bringing it into latching engagement with the keeper 27 whereupon the cap 16 will be free for removal from the nipple or spout 10. On reapplying the cap 16 upon the nipple or spout 10 the skirt 26 thereof which telescopes into the circular portion 12 of said housing 11 will trip the dog 23 to disengage it from the keeper 27 and thus the tension of the spring 51 upon the rod 40 will effect the automatic shifting of the block 22 in the housing 11 so that the dog 23 will enter either of the notches 25 in said skirt 26 upon the turning of the cap 16 upon the nipple or spout 10 and thus lock the cap thereon. Then by manipulating the lock mechanism 25 the slide 31 will be shifted to close the switch 37 of the electric ignition system and thus the engine of the automobile may be started. The abutment 52 on the shifting of the slide 31 to close the switch 37 will coact with said slide so that the rod 40 cannot be manually pushed to release the cap 16 or the locking mechanism operated for this purpose.

Located between the bulged center 18 of the part 17 and the retaining strip 21 is a leaf spring 54, the same being secured by the fastening mediums for the straps 21 and the end portion of this spring 54 functions to engage in the groove 15 in the lining 14 so as to exert a downward pull upon the cap 16 whereby when the latter is engaged upon the nipple or spout 10 the gasket 20 will be compressed against the edge 13 of said nipple or spout and thus sealing the cap upon the nipple or spout. In other words the leaf spring 54 is a tensioning medium for the cap when engaged upon the nipple or spout 10 so as to assure a tight fitting and a firm seating of the gasket upon said nipple or spout. The bulge 18 carries a clip 55 serving as a medium for holding the gasket 20 seated in the cap so that there is no liability of the gasket falling from the cap when the latter is removed from the nipple or spout.

What is claimed is:—

1. The combination with a filling spout of a gas tank, of a closure cap removably telescoped thereon, a skirt formation on the cap and disposed exteriorly of the spout and having keeper notches, a housing on the spout, a slidable block in said housing, a dog pivoted to said block and engageable with either of the keeper notches, a depending keeper on the housing for engagement with the dog when released from the keeper notches, and a spring active upon the dog to urge the same upon movement of the slidable block for positive engagement with the keeper or either of said notches.

2. The combination with a filling spout of a gas tank, of a closure cap removably telescoped thereon, a skirt formation on the cap and disposed exteriorly of the spout and having keeper notches, a housing on the spout, a slidable block in said housing, a dog pivoted to said block and engageable with either of the keeper notches, a depending keeper on the housing for engagement with the dog when released from the keeper notches, a spring active upon the dog to urge the same upon movement of the slidable block for positive engagement with the keeper or either of said notches, and means for manually shifting the slidable block.

In testimony whereof I affix my signature.

JOHN W. M. PROSSER.